United States Patent
Tsukimori et al.

(10) Patent No.: US 7,830,536 B2
(45) Date of Patent: Nov. 9, 2010

(54) PRINT SYSTEM

(75) Inventors: Kanji Tsukimori, Daito (JP);
Toshikatsu Tsukamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1120 days.

(21) Appl. No.: 11/187,015

(22) Filed: Jul. 22, 2005

(65) Prior Publication Data

US 2006/0017961 A1    Jan. 26, 2006

(30) Foreign Application Priority Data

Jul. 22, 2004    (JP)    ............... 2004-213812

(51) Int. Cl.
- *G06F 15/00* (2006.01)
- *G06K 15/00* (2006.01)
- *G06K 1/00* (2006.01)
- *G06F 3/12* (2006.01)

(52) U.S. Cl. ..................... 358/1.14; 358/1.15

(58) Field of Classification Search ........... 358/1.1–1.9, 358/1.11–1.18
See application file for complete search history.

(56) References Cited

U.S. PATENT DOCUMENTS 5,359,660 A * 10/1994 Clark et al. ..................... 726/3
5,752,049 A *  5/1998 Lee ............................ 713/323
5,956,471 A *  9/1999 Ueda et al. ................. 358/1.14
6,369,906 B1     4/2002 Nakao

FOREIGN PATENT DOCUMENTS

| EP | 1 310 863 A2 | 5/2003 |
|---|---|---|
| JP | 08-166860 A | 6/1996 |
| JP | 2000-153655 A | 6/2000 |
| JP | 2002-196913 | 7/2002 |
| JP | 2002-268848 A | 9/2002 |
| JP | 2003-216374 A | 7/2003 |

OTHER PUBLICATIONS

European Search Report in EP 05016003.5 dated Apr. 14, 2009.
Notice of the Reason for Refusal in Japanese Patent Application No. 2004-213812, dated Jul. 7, 2009.

* cited by examiner

*Primary Examiner*—Douglas Q Tran
(74) *Attorney, Agent, or Firm*—Crowell & Moring LLP

(57) ABSTRACT

In a print system including a printer connected to a plurality of personal computers, the personal computer to which a lock command is inputted by a user outputs an ID code of the personal computer and a lock signal to the printer. The printer memorizes the ID code of the personal computer into a memory and goes into an unprintable state. When a lock release command is inputted to the personal computer, it outputs the ID code and a lock release signal to the printer. When the received ID code coincides with the ID code memorized in the memory, the printer goes into a printable state and accepts an image data outputted from the personal computer and performs a printing operation using the image data. Thus, the print system can prevent that the image is printed on an undesirable recording paper sheet for the user.

4 Claims, 3 Drawing Sheets

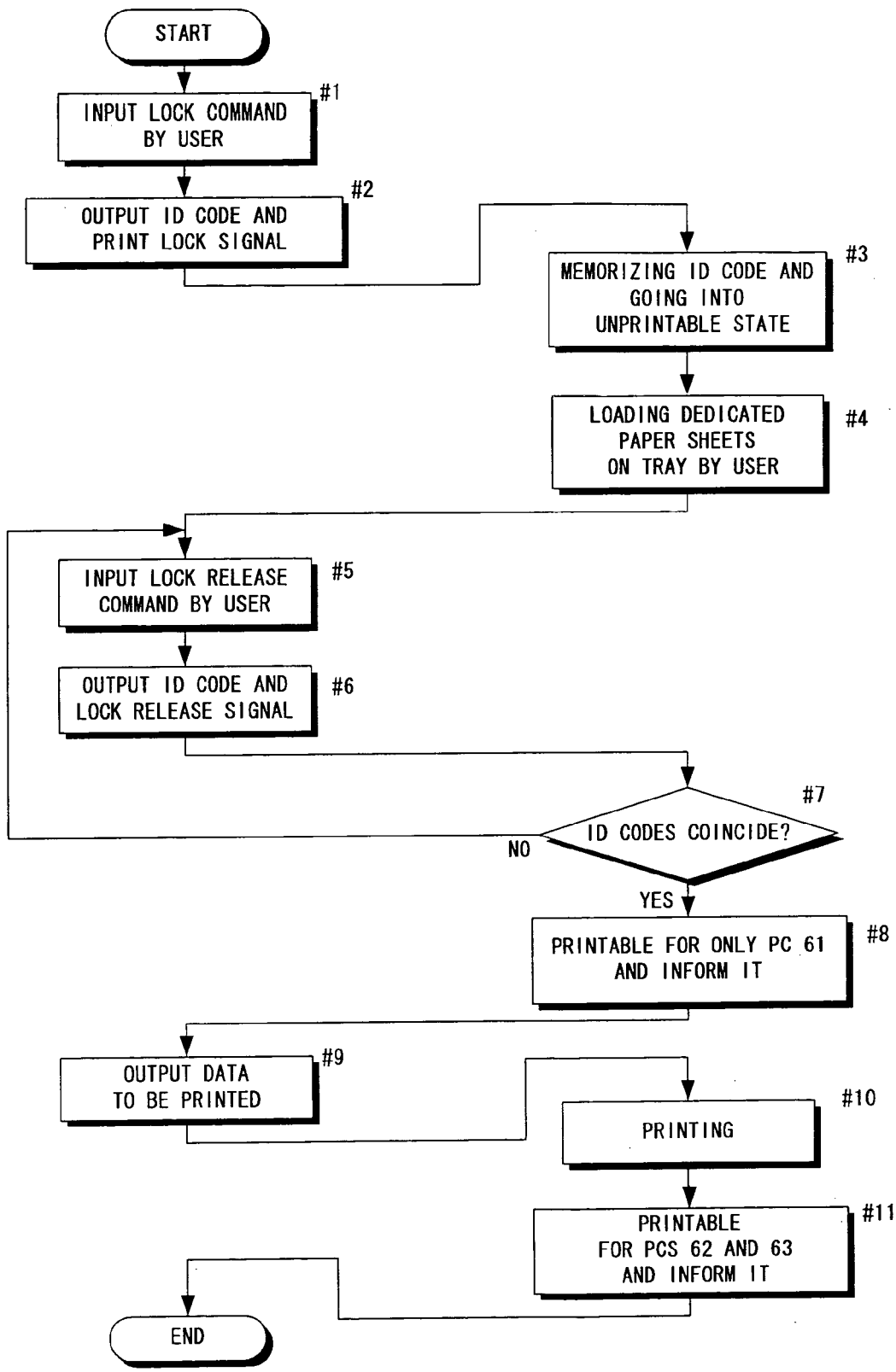

PRINT SYSTEM

BACKGROUND OF THE INVENTION

1. Field of the Invention

The present invention relates to a print system comprised of a plurality of personal computers and a printer connected to the computers.

2. Description of the Related Art

Conventionally, a network-accessible printer capable of connecting to a plurality of personal computers via a network has been put into practical use. In such a printer, print commands are often input to the printer from a plurality of personal computers substantially at the same time. At this time, however, various kinds of recording paper sheets may be used for print with respect to users of the personal computers. For example, a dedicated recording paper sheet optimized for the printer is required to obtain the best image quality for a user, while a reverse face of recording paper sheets on which some unnecessary data is printed suffices to check a draft of a manuscript for another user. When the print commands are input from a plurality of users requiring different types of recording paper sheets almost simultaneously, irrespective of the type of recording paper sheets loaded on a paper feed tray, print is performed in the order of input of the print commands. In this case, print may not be done on desired recording paper sheet. Thus, since the user needs to confirm whether the other person intends to the printer or not when inputting the print command, the printer is not easy to use. Furthermore, when each personal computer connected to the printer via network is located at a position distant from the printer, the above-mentioned confirmation of intention is virtually impossible.

Japanese Laid-Open Patent Publication No. 2002-268848 discloses a system for managing network for preventing data mismatching from occurring simultaneous access in a printer. Japanese Laid-Open Patent Publications No. 2003-216374 and 2000-153655 disclose a network system that locks the operation of a certain interface to protect intelligent setting items by causing a certain file to exist.

SUMMARY OF THE INVENTION

A purpose of the present invention is to provide a printer system that can certainly prevent undesirable print on a recording paper sheet undesirable for a user by rejecting acceptance of a print command from another user with simple operation.

A print system in accordance with an aspect of the present invention comprises a plurality of personal computers, and a printer connected to the personal computers for forming an image on a recording paper sheet with using an image data output from each of the personal computers.

Each personal computer has a command input means used for inputting a print command and a print lock command for locking print operation of the printer and a first control means for controlling each element of the personal computer.

The printer has a paper feed tray on which at least one recording paper sheet is loaded, a recording paper feeding means for feeding the recording paper sheet loaded on the paper feed tray, an image formation means for forming an image on the recording paper sheet fed by the recording paper feeding means and a second control means for controlling each element of the printer.

When the print lock command is inputted to the first control means through the command input means, the first control means outputs a print lock signal to the printer. When the print lock signal is outputted from one of the personal computers, the second control means stops motion of the recording paper feeding means and the image formation means. When an image data is outputted from the personal computer that outputs the print lock signal, the second control means releases stop of the motion of the recording paper transfer means and the image formation means, and drives the recording paper transfer means and the image formation means for forming at least one desired image to be formed on a recording paper sheet with using the input image data. Until the print operation of the printer is completed, a print command outputted from another personal computer is not accepted by the printer.

By such a configuration, by outputting the print lock signal from one of the personal computers to the printer, the print operation of the printer can be locked so that a print command input from the other personal computer is not accepted. Thus, the user can load the desired recording paper sheets on the paper feed tray after the printer goes into locking state. Consequently, it is possible certainly to prevent that print is made on the recording paper sheet undesirable for the user. Furthermore, when the image data is outputted from the personal computer that outputs the print lock signal, locking may be released automatically, and thus the user can control the operation of the printer with simple operation.

Furthermore, it is possible that when the print lock command is inputted to the first control means through the command input means, the first control means outputs an ID code of the personal computer with the lock signal to the printer. When the image data is outputted from the personal computer that outputs the print lock signal, the first control means outputs the ID code of the personal computer with the image data to the printer. When the lock release signal is inputted to the printer, the second control means compares both ID codes. Only when both ID codes coincide with each other, the second control means releases the stop of the motion of the recording paper transfer means and the image formation means.

By such a configuration, when the image data is outputted from another personal computer having different ID code while the printer stops the motion of the recording paper transfer means and the image formation means, the printer forms no image on a recording paper sheet loaded on the paper feed tray. Thus, it is possible to prevent the print of an image on an undesirable recording paper sheet loaded on the paper feed tray for the user of the personal computer having different ID code.

Alternatively, it is possible that the command input means is further used for inputting a lock release command. When the print lock command is inputted to the first control means through the command input means, the first control means outputs an ID code of the personal computer with the lock signal to the printer. When the lock release command inputted to the first control means through the command input means, the first control means outputs the ID code of the personal computer and a lock release signal to the printer. When the lock release signal is inputted to the printer, the second control means compares both ID codes. Only when both ID codes coincide with each other, the second control means releases the stop of the motion of the recording paper transfer means and the image formation means.

By such a configuration, the print lock state of the printer can be released by manual operation of the user of the personal computer from which the print lock signal is outputted to the printer first.

Still furthermore, it is possible that each personal computer further has a display for displaying information whether the printer is in print lock state or print lock release state.

By such a configuration, all the users of the personal computers connected to the printer can easily know whether the printer is in printable state or not.

BRIEF DESCRIPTION OF THE DRAWINGS

FIG. 3 is a flowchart showing a printing operation of the printer and the personal computer in the print system.

DETAILED DESCRIPTION OF THE EMBODIMENT

Figure 1:
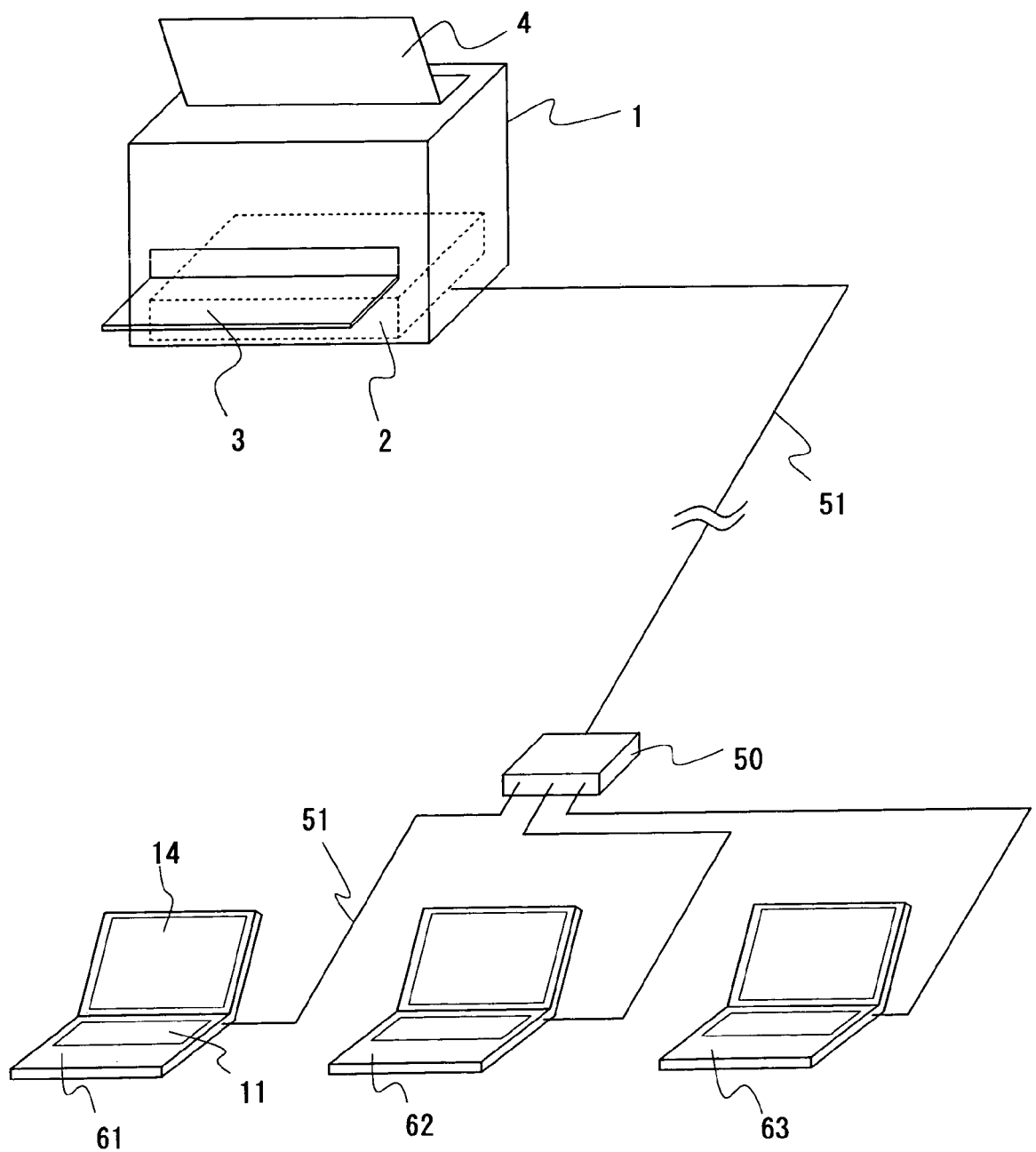
FIG. 1 is a perspective view showing an example of a print system in accordance with an embodiment of the present invention.

A printer in accordance with an embodiment of the present invention will be described with reference to drawings. FIG. 1 shows a network-accessible printer and a plurality of personal computers connected to the printer via network.

The printer 1 is connected to personal computers 61, 62 and 63 via a hub 50 with using LAN cables 51. The printer 1 forms an image on a recording paper sheet with using an image data output from any one of the personal computers 61, 62 and 63. An automatic paper feed tray 2 and a manual paper feed tray 3 are provided at a lower portion of the printer 1 and a paper output tray 4 for ejecting and accumulating the recording paper sheets on which the images are formed is provided at an upper portion of the printer 1.

Figure 2:
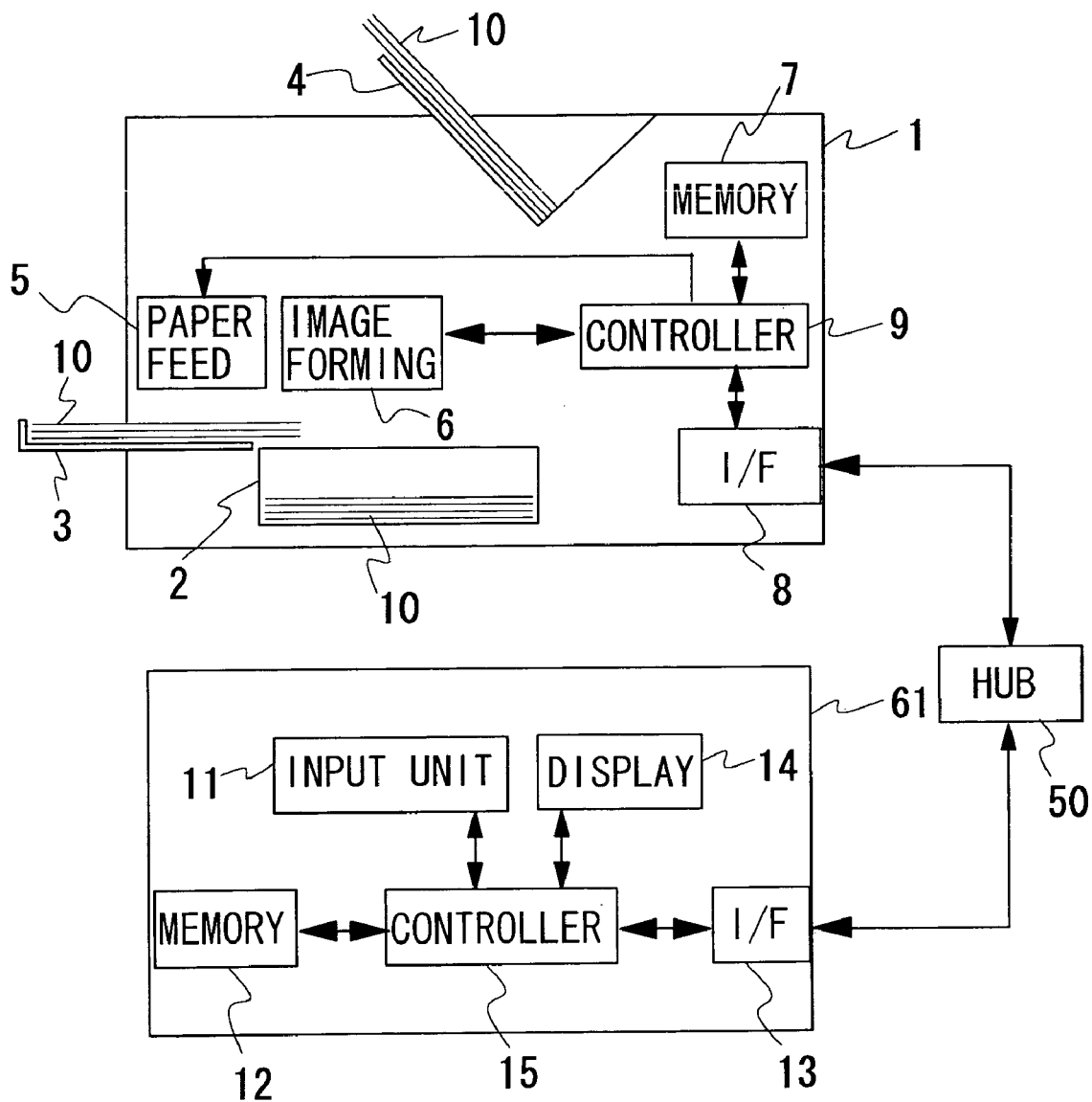
FIG. 2 is a block diagram showing configurations of a printer and a personal computer in the print system.

FIG. 2 shows configurations of the printer 1 and the personal computer A. The printer 1 further has a recording paper feeding mechanism 5 for feeding a recording paper sheet 10 loaded on the automatic paper feed tray 2 and the manual paper feed tray 3, an image formation unit 6 such as an inkjet print head for forming an image on the recording paper sheet 10 fed by the recording paper feeding mechanism 5, a memory (second memory) 7 for memorizing an ID code of the personal computer 61, 62 or 63 that inputs a print command therein, an interface 8 for performing input/output of data to/from the hub 50 and a controller (second controller) 9 such as a CPU for controlling each elements of the printer 1 in addition to the above-mentioned automatic paper feed tray 2, manual paper feed tray 3 and paper output tray 4.

The personal computer 61 has a command input unit 11 such as a keyboard for inputting various commands by a user, a memory (first memory) 12 for memorizing image data output to the printer 1 and various data such as the ID code added to the computer therein, an interface 13 for performing input/output of data to/from the hub 50, a display 14 such as an LCD (Liquid Crystal Display) for displaying various information such as an image, data of which is output to the printer 1 and a controller (first controller) 15 such as a CPU for controlling each elements of the personal computer 61. The personal computers 62 and 63 have the similar configuration to the personal computer 61. Commands input through the command input unit 11 include the print command for causing the printer 1 to perform print, a print lock command for locking print operation of the printer 1 and a lock release command for releasing the print lock command.

In a printer having the automatic paper feed tray 2 and manual paper feed tray 3 as in the printer 1, generally, the recording paper sheet 10 loaded on the manual paper feed tray 3 is fed preferentially by the recording paper feeding mechanism 5 to form an image. Thus, for example, in a term after loading dedicated recording paper sheets on the manual paper feed tray 3 by a user of the personal computer 61 until inputting a print command from the command input unit 11 of the personal computer 61, the other user requiring no dedicated recording paper may erroneously input a print command. In such a case, expensive dedicated recording paper sheets are wasted.

Thus, in the print system in accordance with this embodiment, a print lock signal is outputted from the personal computer 61 to the printer 1 prior to the user of the personal computer 61 loads the dedicated recording paper sheets on the manual paper feed tray 3, so that the print commands output from the personal computer 62 or 63 are not accepted, thereby preventing print on the recording paper sheet 10 undesirable for the user of the personal computer 62 or 63.

Operation of the personal computer A and the printer 1 in the print system in this embodiment for printing an image on a dedicated recording paper sheet by the personal computer 61 will be described with reference to FIG. 3.

First, when the user inputs a lock command through the command input unit 11 of the personal computer 61 (#1), the personal computer 61 outputs the ID code thereof and a print lock signal to the printer 1 (#2). The controller 9 of the printer 1 receives the ID code of the computer A, memorizes them into the memory 7 and stops the motion of the recording paper feeding mechanism 5 and the image formation unit 6 to go into unprintable state (#3).

After that, when the user loads a necessary number of the dedicated recording paper sheets on the manual paper feed tray 3 (#4) and inputs a lock release command through the command input unit 11 of the personal computer A (#5), the personal computer 61 outputs the ID code thereof and a lock release signal to the printer 1 (#6). When the printer 1 receiving the ID code and the lock release command, the controller 9 of the printer 1 compares the ID code (the ID code of the personal computer that outputs the lock release signal) with the ID code stored in the memory 7 (the ID code of the personal computer that outputs the print lock signal) (#7). As a result, when both ID codes coincide with each other (Yes in #7), the controller 9 releases stop of the motion of the recording paper feeding mechanism 5 and the image formation unit 6 only for to the personal computer 61 to be in printable state and informs the personal computer 61 of the fact (#8).

When the personal computer 61 receives the information that the printer 1 goes into printable state, the controller 15 of the personal computer 61 outputs an image data to the printer 1 (#9). When the printer 1 receives the imaged data from the personal computer 61, the controller 9 of the printer 1 drives the recording paper feeding mechanism 5 for feeding the dedicated recording paper sheet loaded on the manual paper feed tray 3 and controls the image formation unit 6 for forming an image on the dedicated recording paper sheet with using the image data (#10). After that, the printer 1 also goes into printable state for the personal computers 62 and 63 (#11), and the image forming process is completed.

When the ID codes do not coincide with each other in the step #7 (No in #7), it is possible to decide that the print command is outputted from the personal computer 62 or 63. Thus, the controller 9 of the printer 1 returns to the step #5 without accepting the print command, and waits input of the command from the personal computer 61. In addition, the information whether the printer 1 is in print lock state or print lock release state is displayed on the liquid crystal display 14 of each of the personal computers 61, 62 and 63. Therefore, the user can recognize the state of the printer 1 by checking the liquid crystal display 14.

As described above, in the print system in accordance with this embodiment, it is possible to lock the print operation of the printer 1 so as not to accept the print command from the other personal computer by outputting the print lock signal from any one of the personal computers 61, 62 and 63 to the printer 1. Thus, the user can load the desired recording paper sheets 10 on the manual paper feed tray 3 after locking the printer 1 and certainly prevent that print is made on undesirable recording paper sheet 10. Furthermore, when the print operation of the concerned personal computer is completed, the locking of the printer 1 with respect to the other personal computers is released automatically, so that the user can control the operation of the printer 1 with a simple operation. Still furthermore, when the ID code of the personal computer outputted together with the print lock signal does not coincide with the ID code of the personal computer outputted together with the lock release signal, the lock release signal is ignored. Thus, even when the print lock signal is outputted from one of the personal computers 61, 62 and 63 and then the lock release signal is outputted from the other personal computer, the locking state of the print operation of the printer 1 can be maintained. As a result, even when the printer 1 is located at a position distant from the personal computer 61, 62 or 63, the user can load the desired recording paper sheets 10 without hurrying.

The present invention is not limited to the configuration of this embodiment and various, modifications are possible. For example, in FIG. 3, when the ID code of the personal computer and image data are outputted to the printer 1 in the step #6 and when the ID codes coincide with each other in the step #7, it is possible to release the locking state of the printer 1 immediately and to proceed the procedure in the step #10 to form an image on the recording paper sheet 10. In such a case, the user can control the operation of the printer 1 with more simple operation. The print operation shown in FIG. 3 is not limited to the case for printing an image on the dedicated recording paper sheet, and can also apply to the case for printing an image on ordinary paper sheet or the reverse surface of the recording paper sheet on which some unnecessary data is printed.

This application is based on Japanese patent application 2004-2213812 filed Jul. 22, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A print system comprising: a plurality of personal computers; and a printer connected to the personal computers for forming an image on a recording paper sheet with using an image data output from each of the personal computers; wherein each personal computer has a command input means used for inputting a print command and a print lock command for locking print operation of the printer and a first control means for controlling each element of the personal computer;

the printer has a paper feed tray on which at least one recording paper sheet is loaded, a recording paper feeding means for feeding the recording paper sheet loaded on the paper feed tray, an image formation means for forming an image on the recording paper sheet fed by the recording paper feeding means and a second control means for controlling each element of the printer;

when a print lock command is inputted to the first control means through the command input means of one of the personal computers, the first control means outputs a print lock signal and a first ID code of the one of the personal computers to the printer;

when the print lock signal and the first ID code are outputted from one of the personal computers, the second control means of the printer stops motion of the recording paper feeding means and makes the image formation means unprintable for all the personal computers and stores the first ID code in a memory;

when an image data and a second ID code are outputted from any one of the personal computers, the second control means of the printer compares the second ID code with the first ID code stored in the memory;

when the second ID code coincides with the first ID code, the second control means of the printer releases stop of the motion of the recording paper transfer means and enables the image formation means to print only for the one of the personal computers that outputs the print lock signal and the first ID code, and drives the recording paper transfer means and the image formation means for forming at least one desired image to be formed on a recording paper sheet with using the input image data;

when a print operation of the printer using the input image data from the one of the personal computers is completed, the second control means of the printer enables the image formation means to print for all the personal computers.

2. The print system in accordance with claim 1, wherein each personal computer further has a display for displaying information whether the printer is in print lock state or print lock release state.

3. The print system in accordance with claim 1, wherein the command input means is further used for inputting a lock release command.

4. A print system that can certainly prevent undesirable print on a recording paper sheet undesirable for a user by rejecting acceptance of a print command from another user comprising: a plurality of personal computers; and a printer connected to the personal computers for forming an image on a recording paper sheet with using an image data output from each of the personal computers; wherein each personal computer has a command input unit for inputting a print command, a print lock command for locking print operation of the printer and a lock release command for releasing the print lock command, a first memory for memorizing a first ID code of the personal computer therein and a first controller for controlling each element of the personal computer;

the printer has a paper feed tray on which at least one recording paper sheet is loaded, a recording paper feeding mechanism for feeding the recording paper sheet loaded on the paper feed tray, an image formation unit for forming an image on a recording paper sheet fed by the recording paper feeding mechanism, a second memory for memorizing the first ID code which is outputted from one of the personal computers that outputs a print command and a second controller for controlling each element of the printer;

when a print lock command is inputted through the command input unit of one of the personal computers, the first controller outputs the first ID code of the one of the personal computers and a print lock signal to the printer;

when the print lock signal and the first ID code are is outputted from the one of the personal computers, the second controller memorizes the first ID code of the personal computers into the second memory of the printer and stops motion of the recording paper feeding mechanism and makes the image formation unit unprintable for all the personal computers;

when a lock release command is inputted through the command input unit of any one of the personal computers, the first controller of any one of the personal computers outputs the first ID code of the any one of the personal computers as a second ID code and the lock release signal;

when the second ID code and the lock release signal are outputted from any one of the personal computers, the second controller of the printer compares the second ID code with the first ID code stored in the second memory;

when the lock release signal is outputted from one of the personal computers, the second controller compares the first ID code of the personal computer that outputs the lock release signal with the second ID code of the personal computer that outputs the print lock signal stored in the second memory;

when the first and second ID codes coincide with each other, the second controller of the printer releases stop of the motion of the recording paper feeding mechanism and enables the image formation unit to allow the printer to be in printable state only for the one of the personal computers that outputs the print lock signal and the first ID code and informs the one of the personal computers that outputs the print lock signal of the fact;

when the first and second ID codes do not coincide with each other, the second controller of the printer ignores the lock release signal inputted from the any one of the personal computers;

when a print operation of the printer using the input image data from the one of the personal computers is completed, the second controller of the printer enables the image formation means to print for all the personal computers;

when the first controller of the one of the personal computers receives information that the printer is in printable state from the second controller of the printer, the first controller outputs an image data to the printer to form a desired image; and when the printer completes the print operation, the second controller releases the stop of the operation of the recording paper feeding mechanism and the image formation unit with respect to the other personal computer to allow the printer to be in printable state.

* * * * *